US012634845B2

(12) United States Patent
Chuang

(10) Patent No.: US 12,634,845 B2
(45) Date of Patent: May 19, 2026

(54) METHOD AND USER EQUIPMENT FOR SUPPORTING AUTOMATIC GAIN CONTROL SYMBOL FOR SIDELINK POSITIONING IN MOBILE COMMUNICATIONS

(71) Applicant: MediaTek Inc., Hsinchu (TW)

(72) Inventor: Chiao-Yao Chuang, Hsinchu (TW)

(73) Assignee: MediaTek Inc., Hsinchu City (TW)

( * ) Notice: Subject to any disclaimer, the term of this patent is extended or adjusted under 35 U.S.C. 154(b) by 290 days.

(21) Appl. No.: 18/372,680

(22) Filed: Sep. 25, 2023

(65) Prior Publication Data

US 2024/0121731 A1     Apr. 11, 2024

Related U.S. Application Data

(60) Provisional application No. 63/379,002, filed on Oct. 11, 2022.

(51) Int. Cl.
*H04W 52/32*        (2009.01)
*H04W 52/52*        (2009.01)
(52) U.S. Cl.
CPC ......... *H04W 52/52* (2013.01); *H04W 52/325* (2013.01)
(58) Field of Classification Search
CPC .... H04W 52/52; H04W 52/325; H04W 52/32
See application file for complete search history.

(56) References Cited

U.S. PATENT DOCUMENTS

2023/0262618 A1 *   8/2023   Ryu ................... H04L 27/2613
370/318

FOREIGN PATENT DOCUMENTS

EP          3198894 B1      4/2020

OTHER PUBLICATIONS

European Patent Office, Extended European Search Report in European Patent Application No. 23202995.9-1213, Mar. 19, 2024.
Mediatek Inc: "The potential solutions for sidelink positioning", 3GPP Draft; R1-2210097, 3GPP, vol. RAN WG1, No., e-Meeting; Oct. 10, 2022-Oct. 19, 2022, Sep. 30, 2022, XP052259568.
Qualcomm: "Moderator Summary #2 on potential solutions for SL positioning", 3GPP Draft; R1-2207974, 3GPP, vol. RAN WG1, No. Toulouse, France; Aug. 22, 2022-Aug. 26, 2022, Aug. 28, 2022, XP052275903.

* cited by examiner

*Primary Examiner* — Tuan H Nguyen
(74) *Attorney, Agent, or Firm* — Andy M. Han; Han IP PLLC

(57)        ABSTRACT
Various solutions for supporting automatic gain control (AGC) symbol for sidelink positioning reference signal (SL-PRS) reception in mobile communications are described. Reception user equipment (Rx UE) may receive a first configuration for an SL-PRS resource. Rx UE may receive one AGC symbol for the SL-PRS resource. Rx UE may receive the SL-PRS resource based on the first configuration. A reference signal in the AGC symbol and an SL-PRS in a last SL-PRS symbol of the SL-PRS resource correspond to a same set of one or more subcarriers.

20 Claims, 6 Drawing Sheets

300

AGC symbol          SL-PRS resource

OFDM symbols

400

AGC symbol   SL-PRS resource

OFDM symbols

500

600

RECEIVE, BY A PROCESSOR OF A Rx UE, A FIRST
CONFIGURATION FOR AN SL-PRS RESOURCE
810

RECEIVE, BY THE PROCESSOR, ONE AGC SYMBOL FOR
THE SL-PRS RESOURCE
820

RECEIVE, BY THE PROCESSOR, THE SL-PRS
RESOURCE BASED ON THE FIRST CONFIGURATION,
WHEREIN AN RS IN THE AGC SYMBOL AND AN SL-PRS
IN A LAST SL-PRS SYMBOL OF THE SL-PRS
RESOURCE CORRESPOND TO A SAME SET OF ONE OR
MORE SUBCARRIERS
830

TRANSMIT, BY A PROCESSOR OF A TX UE, A FIRST CONFIGURATION FOR AN SL-PRS RESOURCE
910

TRANSMIT, BY THE PROCESSOR, ONE AGC SYMBOL FOR THE SL-PRS RESOURCE
920

TRANSMIT, BY THE PROCESSOR, THE SL-PRS RESOURCE BASED ON THE FIRST CONFIGURATION, WHEREIN AN RS IN THE AGC SYMBOL AND AN SL-PRS IN A LAST SL-PRS SYMBOL OF THE SL-PRS RESOURCE CORRESPOND TO A SAME SET OF ONE OR MORE SUBCARRIERS
930

METHOD AND USER EQUIPMENT FOR SUPPORTING AUTOMATIC GAIN CONTROL SYMBOL FOR SIDELINK POSITIONING IN MOBILE COMMUNICATIONS

CROSS REFERENCE TO RELATED PATENT APPLICATION(S)

The present disclosure is part of a non-provisional application claiming the priority benefit of U.S. Patent Application No. 63/379,002, filed 11 Oct. 2022, the content of which herein being incorporated by reference in its entirety.

TECHNICAL FIELD

The present disclosure is generally related to mobile communications and, more particularly, to supporting automatic gain control (AGC) symbol for sidelink-positioning reference signal (SL-PRS) reception in mobile communications.

BACKGROUND

Unless otherwise indicated herein, approaches described in this section are not prior art to the claims listed below and are not admitted as prior art by inclusion in this section.

In 5G New Radio (NR), SL-PRS is a reference signal (RS) used in the SL transmission between user equipments (UEs), for reception (Rx) UE(s) to determine relative position information with respect to transmission (Tx) UE(s). The SL signal transmission in a slot generally contains a AGC symbol in the front to facilitate Rx UEs for receiving the SL signal. Under current SL framework, the SL transmission in a slot may be transited to reception in the next slot, such that the Tx-Rx turnaround time may be needed to facilitate the transition when SL positioning is operated.

In 3$^{rd}$ Generation Partnership Project (3GPP) Release 17, the AGC symbol is supported for physical channel transmission in SL communication, with a general rule that the first orthogonal frequency division modulation (OFDM) symbol of a physical channel is duplicated in the OFDM symbol immediately preceding the first OFDM symbol of the physical channel. However, the details of introducing AGC symbol for SL-PRS have not been fully discussed yet and some issues need to be solved. One of the issues relates to what content needs to be included in the AGC symbol. Another issue relates to where the AGC symbol should be allocated with respect to the staggering structure of the SL-PRS pattern. Therefore, there is a need to provide proper schemes to support AGC symbol for SL-PRS reception.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to supporting AGC symbol for SL-PRS reception in mobile communications.

In one aspect, a method may involve a Rx UE receiving a first configuration for an SL-PRS resource. The method may also involve the Rx UE receiving one AGC symbol for the SL-PRS resource. The method may further involve the Rx UE receiving the SL-PRS resource based on the first configuration. A reference signal in the AGC symbol and an SL-PRS in a last SL-PRS symbol of the SL-PRS resource correspond to a same set of one or more subcarriers.

In one aspect, a method may involve a Tx UE transmitting a first configuration for an SL-PRS resource. The method may also involve the Tx UE transmitting one AGC symbol for the SL-PRS resource. The method may further involve the Tx UE transmitting the SL-PRS resource based on the first configuration. A reference signal in the AGC symbol and an SL-PRS in a last SL-PRS symbol of the SL-PRS resource correspond to a same set of one or more subcarriers.

In one aspect, a Rx UE may comprise a transceiver which, during operation, wirelessly communicates with a Tx UE. The Rx UE may also comprise a processor communicatively coupled to the transceiver. The processor, during operation, may perform operations comprising receiving, via the transceiver, a first configuration for an SL-PRS resource. The processor may also perform operations comprising receiving, via the transceiver, one AGC symbol for the SL-PRS resource. The processor may further perform operations comprising receiving, via the transceiver, the SL-PRS resource based on the first configuration. A reference signal in the AGC symbol and an SL-PRS in a last SL-PRS symbol of the SL-PRS resource correspond to a same set of one or more subcarriers.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to supporting AGC symbol for SL-PRS reception in mobile communications. According to the present disclosure, a number of possible solutions may be implemented separately or jointly. That is, although these possible solutions may be described below separately, two or more of these possible solutions may be implemented in one combination or another.

Figure 1:
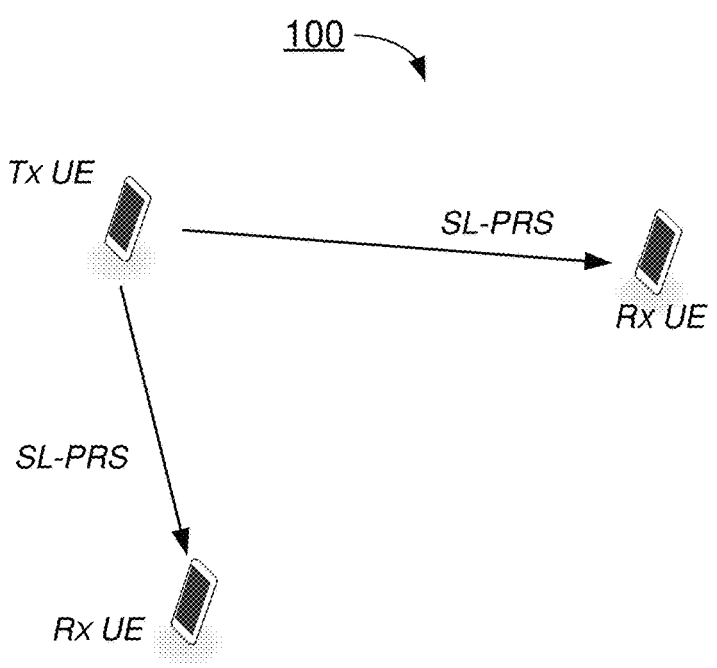
FIG. 1 is a diagram depicting an example scenario of NR SL framework under schemes in accordance with implementations of the present disclosure.

FIG. 1 illustrates an example scenario 100 of NR SL framework under schemes in accordance with implementations of the present disclosure. Scenario 100 involves a Tx UE and a plurality of Rx UEs, which may be a part of a wireless communication network (e.g., an LTE network, a 5G/NR network, an IoT network or a 6G network). Scenario 100 illustrates the current NR SL (i.e., NR vehicle-to-everything (V2X)) framework. The Tx UE may communicate with the Rx UEs. The Tx UE may transmit SL-PRS(s) to the Rx UEs. Each Rx UE may measure the corresponding SL-PRS and report the measurement results to a computation entity.

Figure 2:
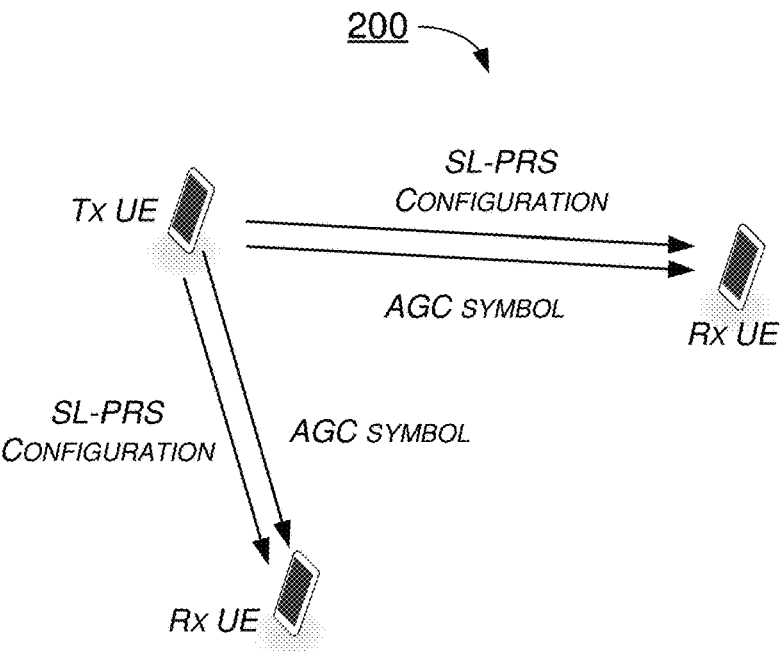
FIG. 2 is a diagram depicting an example scenario of configuring AGC symbol and SL-PRS resource under schemes in accordance with implementations of the present disclosure.

FIG. 2 illustrates an example scenario 200 of configuring AGC symbol and SL-PRS resource under schemes in accordance with implementations of the present disclosure. Scenario 200 involves a Tx UE and a plurality of Rx UEs, which may be a part of a wireless communication network (e.g., an LTE network, a 5G/NR network, an IoT network or a 6G network). To support Rx UEs to receive SL-PRS, the Tx UE may transmit an SL-PRS configuration and an AGC symbol to the Rx UEs. The SL-PRS configuration may be transmitted via the physical sidelink control channel (PSCCH) and physical sidelink shared channel (PSSCH). Accordingly, the Rx UEs may perform AGC tuning/adjustment based on the AGC symbol(s), and perform measurement for SL positioning based on the SL-PRS resource.

It is noteworthy that, if the occupied set of subcarriers is the same between the RS in the AGC symbol and that in the last SL-PRS symbol, it may allow the Rx UE to further perform frequency offset estimation to estimate the relative speed between itself and the Tx UE. This is because the PSCCH of scheduling the SL-PRS also has corresponding AGC symbol, i.e., the Rx UE may use the AGC symbol of PSCCH for gain adjustment to receive both PSCCH and SL-PRS. The Rx UE may also measure the gain on the AGC symbol for PSCCH and SL-PRS, respectively, to identify the gain difference. Therefore, in the following time instances for reception, the Rx UE does not always need to use the AGC symbol for SL-PRS to perform reception gain adjustment. In the case where the Rx UE decides not to perform reception gain adjustment using the AGC symbol for SL-PRS, the AGC symbol may still be used together with the last SL-PRS symbol for relative speed estimation. The phase difference between the RSs in two different OFDM symbols may be used to extract the frequency offset. The phase difference between the RSs in different OFDM symbols but in the same subcarrier will not be influenced seriously by the channel, since the channel response may have different phases in different subcarriers.

More specifically, in the case of one AGC symbol immediately preceding the SL-PRS resource (i.e., for the AGC symbol allocation, there is one OFDM symbol length over the time domain but across multiple subcarriers over the frequency domain), the RS in the AGC symbol and the SL-PRS in the last SL-PRS symbol of the SL-PRS resource correspond to the same set of subcarriers, i.e., the RS in the AGC symbol and the SL-PRS in the last SL-PRS symbol are configured/transmitted with the same resource element (RE) offset (or called frequency offset). Alternatively, in the case of two AGC symbols immediately preceding the SL-PRS resource (i.e., for the AGC symbol allocation, there are two OFDM symbols length over the time domain but across multiple subcarriers over the frequency domain), the AGC symbols and the last two SL-PRS symbols in the SL-PRS resource correspond to the same set of subcarriers, i.e., the RS in the AGC symbols and the SL-PRS in the last two SL-PRS symbols are configured/transmitted with the same RE offset (or called frequency offset).

In some implementations, each AGC symbol may include an SL-PRS. Additionally, or optionally, the SL-PRS may include a sequence that is initialized based on a symbol index of the AGC symbol within a slot. For instance, the sequence may be denoted as r(m) which is defined by:

$$r(m) = \frac{1}{\sqrt{2}}(1 - 2c(2m)) + j\frac{1}{\sqrt{2}}(1 - 2c(2m + 1))$$

where the pseudo-random sequence c(i) is defined in 3GPP. The pseudo-random sequence generator may be initialized with:

$$c_{init} = \left(2^{22}\left\lfloor\frac{n_{ID,seq}^{SL-PRS}}{1024}\right\rfloor\right) +$$

-continued $$2^{10}\left(N_{symb}^{slot}n_{s,f}^{\mu}+l+1\right)\left(2\left(n_{ID,seq}^{SL-PRS}\bmod 1024\right)+1\right)+\left(n_{ID,seq}^{SL-PRS}\bmod 1024\right)\right)\bmod 2^{31}$$

where $$n_{s,f}^{\mu}$$

is the slot number within the radio frame, l is the OFDM symbol within the slot to which the sequence is mapped, $$n_{ID,seq}^{SL-PRS}\in\{0,\ 1,\ \ldots\ ,\ 4095\}$$

is the sidelink PRS sequence ID.

In particular, the AGC symbol for SL-PRS has its own associated OFDM symbol index to generate the sequence. Accordingly, the sequence generated for the AGC symbol would be different from that for the SL-PRS symbols for the SL-PRS resource, since the initialization seed is controlled by the OFDM symbol index.

In some implementations, the RS in the AGC symbol and the SL-PRS in the SL-PRS symbols of the SL-PRS resource may be transmitted/received via the same spatial filter.

In some implementations, the RS in the AGC symbol(s) and the SL-PRS in the SL-PRS symbols of the SL-PRS resource may be quasi co-located (QCLed).

In some implementations, the AGC symbol may be disabled by another configuration received from the wireless communication network (e.g., an LTE network, a 5G/NR network, an IoT network or a 6G network). For example, the AGC symbol for SL-PRS is enabled by default, and if such configuration is received, the AGC symbol for SL-PRS is disabled. This configuration may be received via higher layer message carried by the PSSCH.

In some implementations, the OFDM symbol following the last SL-PRS symbol may serve as a guard symbol for Tx-Rx turnaround.

Figure 3:
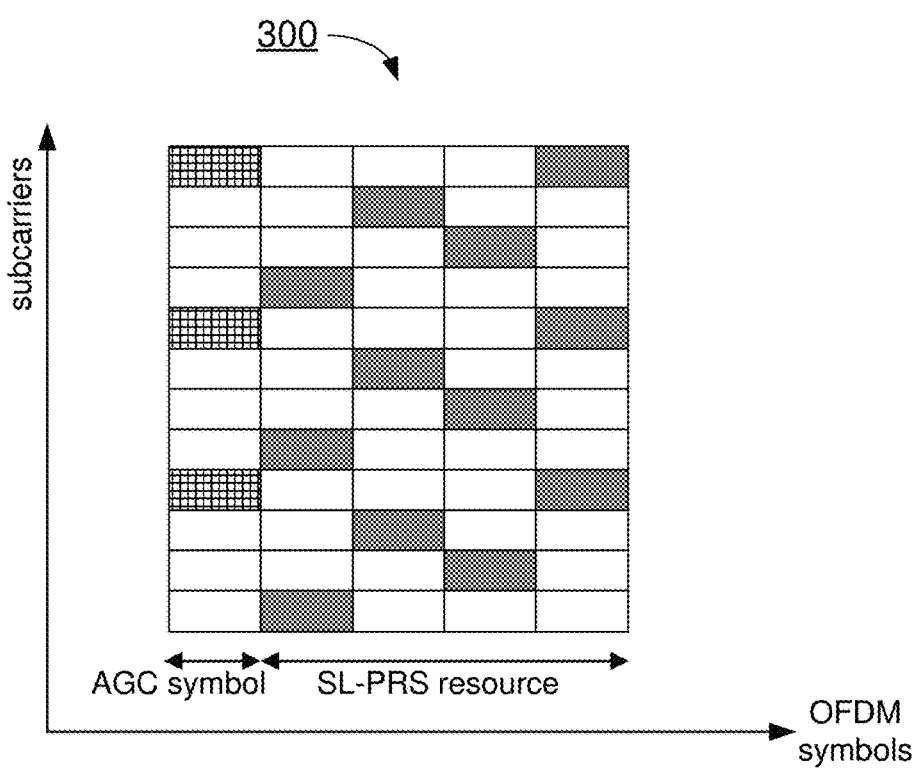
FIG. 3 is a diagram depicting an example scenario of AGC symbol allocation before an SL-PRS resource under schemes in accordance with implementations of the present disclosure.

FIG. 3 illustrates an example scenario 300 of AGC symbol allocation before an SL-PRS resource under schemes in accordance with implementations of the present disclosure. Scenario 300 illustrates an SL-PRS resource with comb size 4 and four OFDM symbols length, and the AGC symbol has one OFDM symbol length. The SL-PRS symbols are arranged in a full staggering structure according to the RE offsets of the SL-PRS symbols. In one example, the RE offset values may be given by 3GPP technical specification (TS) 38.211, clause 7.4.1.7.3, where in the case of comb size 4, the RE offsets for the SL-PRS symbols from symbol number 0 to symbol number 11 are {0, 2, 1, 3, 0, 2, 1, 3, 0, 2, 1, 3, 0, 2, 1, 3}. As shown in FIG. 3, the AGC symbol has an RE offset=3 which is the same as the RE offset of the last SL-PRS symbol (i.e., the SL-PRS symbol with symbol number=3). That is, the RS in the AGC symbol and the SL-PRS in the last SL-PRS symbol occupy the same set of subcarriers.

Figure 4:
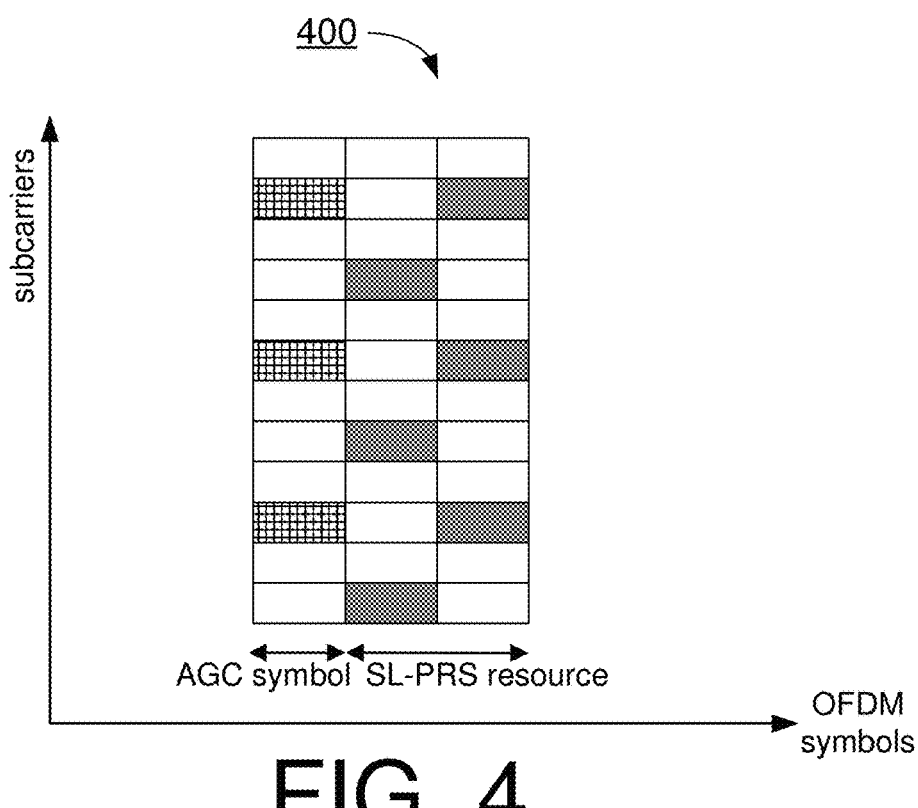
FIG. 4 is a diagram depicting an example scenario of AGC symbol allocation before an SL-PRS resource under schemes in accordance with implementations of the present disclosure.

FIG. 4 illustrates an example scenario 400 of AGC symbol allocation before an SL-PRS resource under schemes in accordance with implementations of the present disclosure. Scenario 400 illustrates an SL-PRS resource with comb size 4 and two OFDM symbols length, and the AGC symbol has one OFDM symbol length. Similar to scenario 300 in FIG. 3, the SL-PRS symbols in scenario 400 are arranged with the same RE offset pattern. As shown in FIG. 4, the AGC symbol has an RE offset=2 which is the same as the RE offset of the last SL-PRS symbol (i.e., the SL-PRS symbol with symbol number=1). That is, the RS in the AGC symbol and the SL-PRS in the last SL-PRS symbol occupy the same set of subcarriers.

Figure 5:
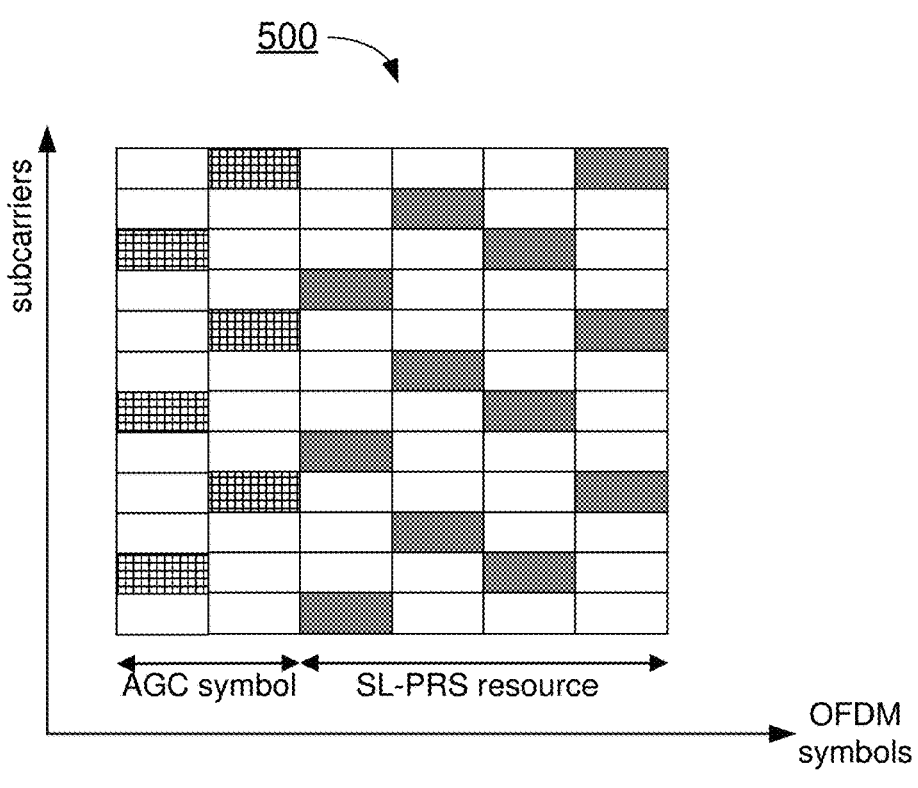
FIG. 5 is a diagram depicting an example scenario of AGC symbol allocation before an SL-PRS resource under schemes in accordance with implementations of the present disclosure.

FIG. 5 illustrates an example scenario 500 of AGC symbol allocation before an SL-PRS resource under schemes in accordance with implementations of the present disclosure. Scenario 500 illustrates an SL-PRS resource with comb size 4 and four OFDM symbols length, and the AGC symbol has two OFDM symbols length. Similar to scenario 300 in FIG. 3, the SL-PRS symbols in scenario 500 are arranged with the same RE offset pattern. As shown in FIG. 5, the first AGC symbol has an RE offset=1 which is the same as the RE offset of the second last SL-PRS symbol (i.e., the SL-PRS symbol with symbol number=2), and the second AGC symbol has an RE offset=3 which is the same as the RE offset of the last SL-PRS symbol (i.e., the SL-PRS symbol with symbol number=3). That is, the RS in the AGC symbols and the SL-PRS in the last two SL-PRS symbols occupy the same set of subcarriers.

Figure 6:
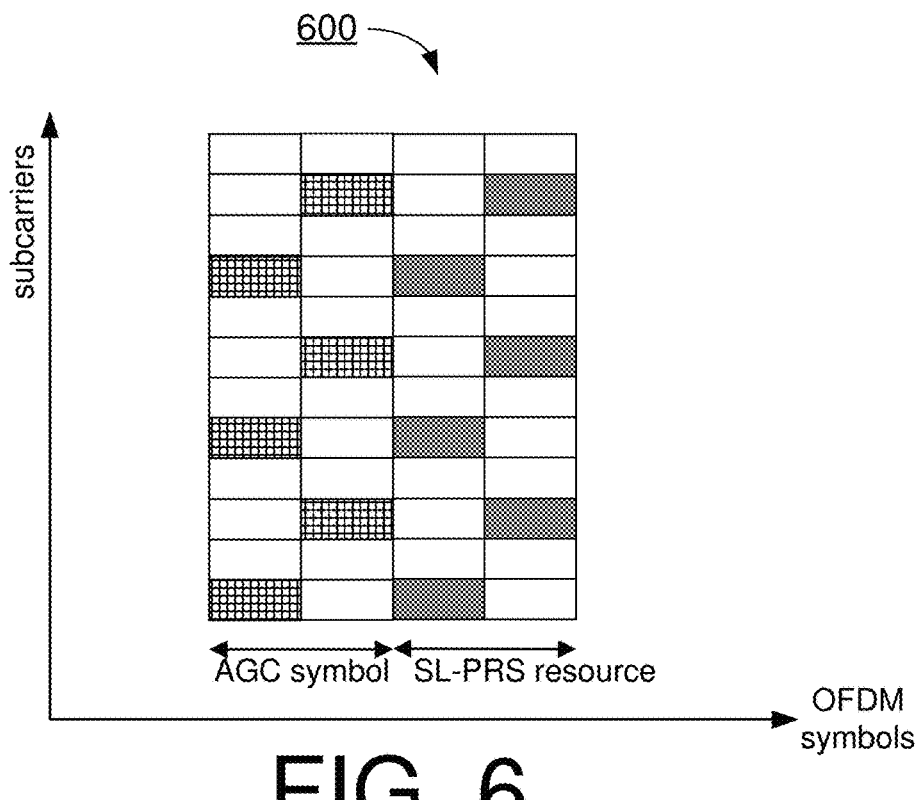
FIG. 6 is a diagram depicting an example scenario of AGC symbol allocation before an SL-PRS resource under schemes in accordance with implementations of the present disclosure.

FIG. 6 illustrates an example scenario 600 of AGC symbol allocation before an SL-PRS resource under schemes in accordance with implementations of the present disclosure. Scenario 600 illustrates an SL-PRS resource with comb size 4 and two OFDM symbols length, and the AGC symbol has two OFDM symbols length. Similar to scenario 300 in FIG. 3, the SL-PRS symbols in scenario 600 are arranged with the same RE offset pattern. As shown in FIG. 6, the first AGC symbol has an RE offset=0 which is the same as the RE offset of the second last SL-PRS symbol (i.e., the SL-PRS symbol with symbol number=0), and the second AGC symbol has an RE offset=2 which is the same as the RE offset of the last SL-PRS symbol (i.e., the SL-PRS symbol with symbol number=1). That is, the RS in the AGC symbols and the SL-PRS in the last two SL-PRS symbols occupy the same set of subcarriers.

Illustrative Implementations

Figure 7:
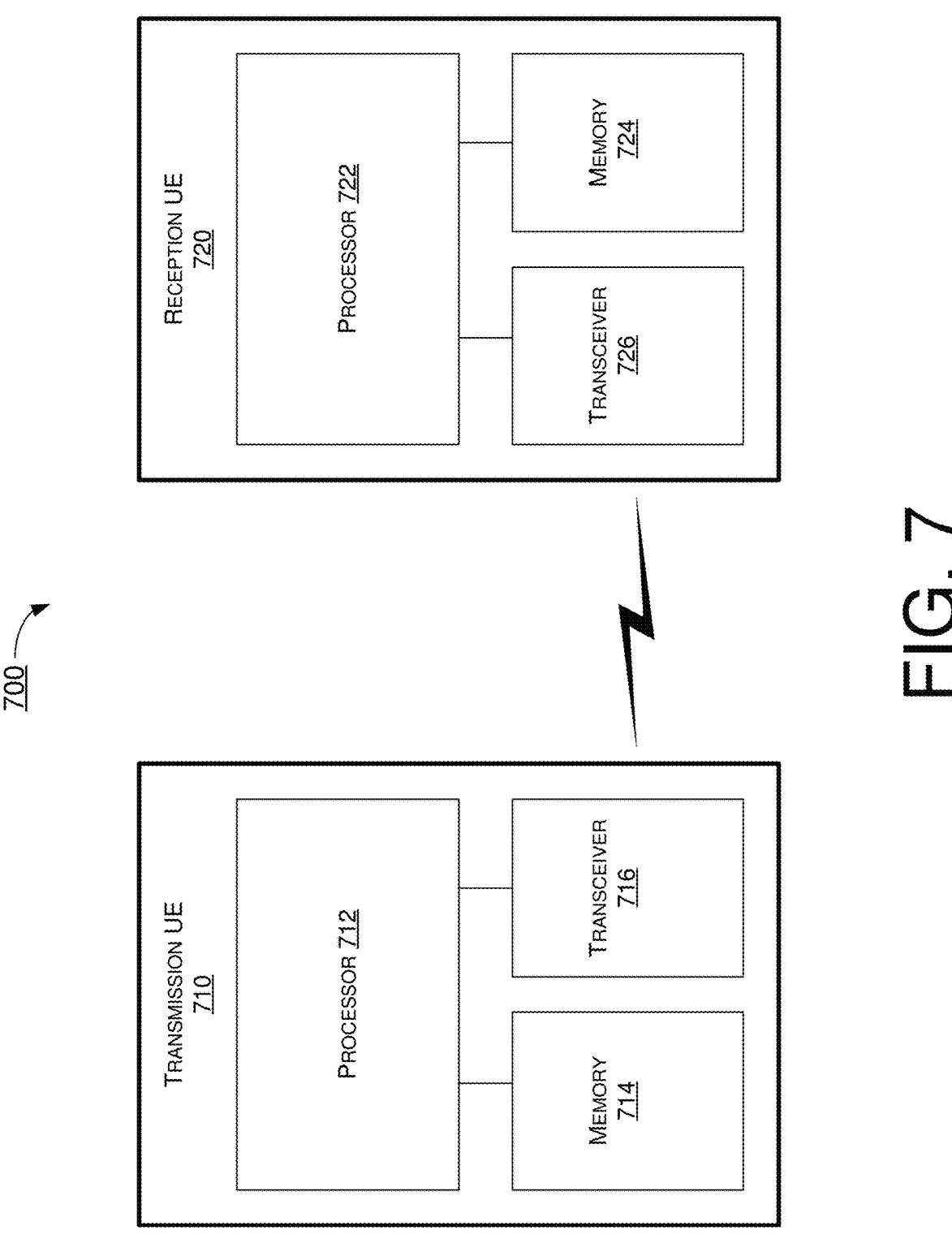
FIG. 7 is a block diagram of an example communication system in accordance with an implementation of the present disclosure.

FIG. 7 illustrates an example communication system 700 having an example Tx UE 710 and an example Rx UE 720 in accordance with an implementation of the present disclosure. Each of Tx UE 710 and Rx UE 720 may perform various functions to implement schemes, techniques, processes and methods described herein pertaining to supporting AGC symbol for SL-PRS reception in mobile communications, including scenarios/schemes described above as well as processes 800 and 900 described below.

Tx UE 710 may be a part of an electronic apparatus such as a portable or mobile apparatus, a wearable apparatus, a wireless communication apparatus or a computing apparatus. For instance, Tx UE 710 may be implemented in a smartphone, a smartwatch, a personal digital assistant, a digital camera, or a computing equipment such as a tablet computer, a laptop computer or a notebook computer. Tx UE 710 may also be a part of a machine type apparatus, which may be an IoT, NB-IoT, or IIoT apparatus such as an immobile or a stationary apparatus, a home apparatus, a wire communication apparatus or a computing apparatus. For instance, Tx UE 710 may be implemented in a smart thermostat, a smart fridge, a smart door lock, a wireless speaker or a home control center. Alternatively, Tx UE 710 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Tx UE 710 may include at least some of those components shown in FIG. 7 such as a processor 712, for example. Tx UE 710 may further include one or more other components not pertinent to the proposed scheme of the present disclosure (e.g., internal power supply, display device and/or user interface device), and, thus, such component(s) of Tx UE 710 are neither shown in FIG. 7 nor described below in the interest of simplicity and brevity.

Rx UE 720 may be a part of an electronic apparatus such as a portable or mobile apparatus, a wearable apparatus, a wireless communication apparatus or a computing apparatus. For instance, Rx UE 720 may be implemented in a smartphone, a smartwatch, a personal digital assistant, a digital camera, or a computing equipment such as a tablet computer, a laptop computer or a notebook computer. Rx UE 720 may also be a part of a machine type apparatus, which may be an IoT, NB-IoT, or IIoT apparatus such as an immobile or a stationary apparatus, a home apparatus, a wire communication apparatus or a computing apparatus. For instance, Rx UE 720 may be implemented in a smart thermostat, a smart fridge, a smart door lock, a wireless speaker or a home control center. Alternatively, Rx UE 720 may be implemented in the form of one or more IC chips such as, for example and without limitation, one or more single-core processors, one or more multi-core processors, one or more RISC processors, or one or more CISC) processors. Rx UE 720 may include at least some of those components shown in FIG. 7 such as a processor 722, for example. Rx UE 720 may further include one or more other components not pertinent to the proposed scheme of the present disclosure (e.g., internal power supply, display device and/or user interface device), and, thus, such component(s) of Rx UE 720 are neither shown in FIG. 7 nor described below in the interest of simplicity and brevity.

It should be noted that, in some implementations, Tx UE 710 may have the functions of Rx UE and be operated as a Rx UE while Rx UE 720 having the functions of Tx UE and being operated as a Tx UE.

In one aspect, each of processor 712 and processor 722 may be implemented in the form of one or more single-core processors, one or more multi-core processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including supporting AGC symbol for SL-PRS reception in a UE (e.g., as represented by Tx UE 710) and another UE (e.g., as represented by Rx UE 720) in accordance with various implementations of the present disclosure.

In some implementations, Tx UE 710 may also include a transceiver 716 coupled to processor 712 and capable of wirelessly transmitting and receiving data. In some implementations, Tx UE 710 may further include a memory 714 coupled to processor 712 and capable of being accessed by processor 712 and storing data therein. In some implementations, Rx UE 720 may also include a transceiver 726 coupled to processor 722 and capable of wirelessly transmitting and receiving data. In some implementations, Rx UE 720 may further include a memory 724 coupled to processor 722 and capable of being accessed by processor 722 and storing data therein. Accordingly, Tx UE 710 and Rx UE 720 may wirelessly communicate with each other via transceiver 716 and transceiver 726, respectively.

From Rx UE perspective, processor 722 may receive, via transceiver 726, a first configuration for an SL-PRS resource. Then, processor 722 may receive, via transceiver 726, one AGC symbol for the SL-PRS resource. Also, processor 722 may receive, via transceiver 726, the SL-PRS resource based on the first configuration. An RS in the AGC symbol and an SL-PRS in a last SL-PRS symbol of the SL-PRS resource correspond to a same set of one or more subcarriers.

In some implementations, the RS in the AGC symbol and the SL-PRS in the last SL-PRS symbol of the SL-PRS resource may be configured with a same RE offset.

In some implementations, the AGC symbol may be disabled by a second configuration (e.g., received via higher layer message carried by the PSSCH).

In some implementations, the AGC symbol may include an SL-PRS. Additionally, or optionally, the SL-PRS may include a sequence that is initialized based on a symbol index of the AGC symbol within a slot.

In some implementations, processor 722 may also adjust a reception gain based on the AGC symbol.

In some implementations, processor 722 may also perform a relative speed estimation based on the AGC symbol and the last SL-PRS symbol of the SL-PRS resource.

From Tx UE perspective, processor 712 may transmit, via transceiver 716, a first configuration for an SL-PRS resource. Then, processor 712 may transmit, via transceiver 716, one AGC symbol for the SL-PRS resource. Also, processor 712 may transmit, via transceiver 716, the SL-PRS resource based on the first configuration. An RS in the AGC symbol and an SL-PRS in a last SL-PRS symbol of the SL-PRS resource correspond to a same set of one or more subcarriers.

In some implementations, the RS in the AGC symbol and the SL-PRS in the last SL-PRS symbol of the SL-PRS resource may be transmitted with a same RE offset.

In some implementations, the AGC symbol may be disabled by a second configuration (e.g., transmitted via higher layer message carried by the PSSCH).

In some implementations, the AGC symbol may include an SL-PRS. Additionally, or optionally, the SL-PRS may include a sequence that is initialized based on a symbol index of the AGC symbol within a slot.

In some implementations, the RS in the AGC symbol and the SL-PRS in the SL-PRS symbols of the SL-PRS resource may be transmitted via a same spatial filter.

In some implementations, the RS in the AGC symbol and the SL-PRS in the SL-PRS symbols of the SL-PRS resource may be QCLed.

Illustrative Processes

Figure 8:
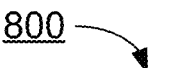
FIG. 8 is a flowchart of an example process in accordance with an implementation of the present disclosure.
Figure 8:
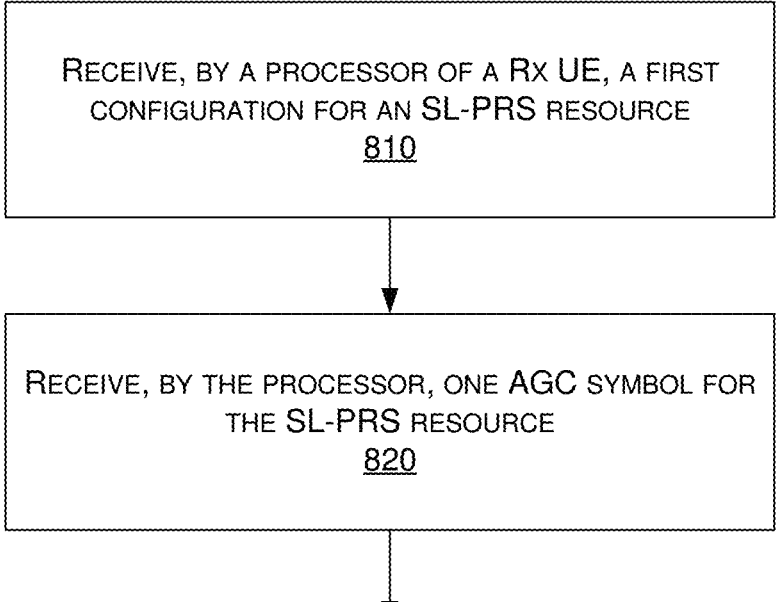

FIG. 8 illustrates an example process 800 in accordance with an implementation of the present disclosure. Process 800 may be an example implementation of above scenarios/schemes, whether partially or completely, with respect to supporting AGC symbol for SL-PRS reception in mobile communications. Process 800 may represent an aspect of implementation of features of Rx UE 720. Process 800 may include one or more operations, actions, or functions as illustrated by one or more of blocks 810 to 830. Although illustrated as discrete blocks, various blocks of process 800 may be divided into additional blocks, combined into fewer blocks, or eliminated, depending on the desired implementation. Moreover, the blocks of process 800 may be executed in the order shown in FIG. 8 or, alternatively, in a different order. Process 800 may be implemented by Rx UE 720 or any suitable UE or machine type devices. Solely for illustrative purposes and without limitation, process 800 is described below in the context of Rx UE 720. Process 800 may begin at block 810.

At 810, process 800 may involve processor 722 of Rx UE 720 receiving, via transceiver 726, a first configuration for an SL-PRS resource. Process 800 may proceed from 810 to 820.

At 820, process 800 may involve processor 722 receiving, via transceiver 726, one AGC symbol for the SL-PRS resource. Process 800 may proceed from 820 to 830.

At 830, process 800 may involve processor 722 receiving, via transceiver 726, the SL-PRS resource based on the first configuration. An RS in the AGC symbol and an SL-PRS in a last SL-PRS symbol of the SL-PRS resource correspond to a same set of one or more subcarriers.

In some implementations, the RS in the AGC symbol and the SL-PRS in the last SL-PRS symbol of the SL-PRS resource may be configured with a same RE offset.

In some implementations, the AGC symbol may be disabled by a second configuration (e.g., received via higher layer message carried by the PSSCH).

In some implementations, the AGC symbol may include an SL-PRS. Additionally, or optionally, the SL-PRS may include a sequence that is initialized based on a symbol index of the AGC symbol within a slot.

In some implementations, process 800 may further involve processor 722 adjusting a reception gain based on the AGC symbol.

In some implementations, process 800 may further involve processor 722 performing a relative speed estimation based on the AGC symbol and the last SL-PRS symbol of the SL-PRS resource.

Figure 9:
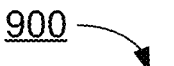
FIG. 9 is a flowchart of an example process in accordance with an implementation of the present disclosure.
Figure 9:
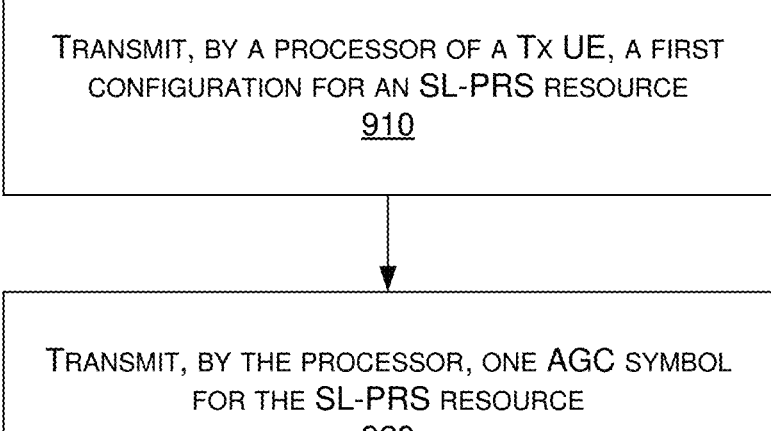

FIG. 9 illustrates an example process 900 in accordance with an implementation of the present disclosure. Process 900 may be an example implementation of above scenarios/schemes, whether partially or completely, with respect to supporting AGC symbol for SL-PRS reception in mobile communications. Process 900 may represent an aspect of implementation of features of Tx UE 710. Process 900 may include one or more operations, actions, or functions as illustrated by one or more of blocks 910 to 930. Although illustrated as discrete blocks, various blocks of process 900 may be divided into additional blocks, combined into fewer blocks, or eliminated, depending on the desired implementation. Process 900 may be implemented by Tx UE 710 or any suitable UE or machine type devices. Solely for illustrative purposes and without limitation, process 900 is described below in the context of Tx UE 710.

At 910, process 900 may involve processor 712 of Tx UE 710 transmitting, via transceiver 716, a first configuration for an SL-PRS resource. Process 900 may proceed from 910 to 920.

At 920, process 900 may involve processor 712 transmitting, via transceiver 716, one AGC symbol for the SL-PRS resource. Process 900 may proceed from 920 to 930.

At 930, process 900 may involve processor 712 transmitting, via transceiver 716, the SL-PRS resource based on the first configuration. An RS in the AGC symbol and an SL-PRS in a last SL-PRS symbol of the SL-PRS resource correspond to a same set of one or more subcarriers.

In some implementations, the RS in the AGC symbol and the SL-PRS in the last SL-PRS symbol of the SL-PRS resource may be transmitted with a same RE offset.

In some implementations, the AGC symbol may be disabled by a second configuration (e.g., transmitted via higher layer message carried by the PSSCH).

In some implementations, the AGC symbol may include an SL-PRS. Additionally, or optionally, the SL-PRS may include a sequence that is initialized based on a symbol index of the AGC symbol within a slot.

In some implementations, the RS in the AGC symbol and the SL-PRS in the SL-PRS symbols of the SL-PRS resource may be transmitted via a same spatial filter.

In some implementations, the RS in the AGC symbol and the SL-PRS in the SL-PRS symbols of the SL-PRS resource may be QCLed.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of a reception user equipment (Rx UE), a first configuration for a sidelink-positioning reference signal (SL-PRS) resource;
receiving, by the processor, one automatic gain control (AGC) symbol for the SL-PRS resource; and
receiving, by the processor, the SL-PRS resource based on the first configuration, wherein a reference signal (RS) in the AGC symbol and an SL-PRS in a last SL-PRS symbol of the SL-PRS resource correspond to a same set of one or more subcarriers.

2. The method of claim 1, wherein the RS in the AGC symbol and the SL-PRS in the last SL-PRS symbol of the SL-PRS resource are configured with a same resource element (RE) offset.

3. The method of claim 1, wherein the AGC symbol is disabled by a second configuration.

4. The method of claim 1, wherein the AGC symbol comprises an SL-PRS.

5. The method of claim 4, wherein the SL-PRS comprises a sequence that is initialized based on a symbol index of the AGC symbol within a slot.

6. The method of claim 1, further comprising:
adjusting, by the processor, a reception gain based on the AGC symbol.

7. The method of claim 1, further comprising:
performing, by the processor, a relative speed estimation based on the AGC symbol and the last SL-PRS symbol of the SL-PRS resource.

8. A method, comprising:
transmitting, by a processor of a transmission user equipment (Tx UE), a first configuration for a sidelink-positioning reference signal (SL-PRS) resource;
transmitting, by the processor, one automatic gain control (AGC) symbol for the SL-PRS resource; and
transmitting, by the processor, the SL-PRS resource based on the first configuration, wherein a reference signal (RS) in the AGC symbol and an SL-PRS in a last SL-PRS symbol of the SL-PRS resource correspond to a same set of one or more subcarriers.

9. The method of claim 8, wherein the RS in the AGC symbol and the SL-PRS in the last SL-PRS symbol of the SL-PRS resource are transmitted with a same resource element (RE) offset.

10. The method of claim 8, wherein the AGC symbol is disabled by a second configuration.

11. The method of claim 8, wherein the AGC symbol comprises an SL-PRS.

12. The method of claim 11, wherein the SL-PRS comprises a sequence that is initialized based on a symbol index of the AGC symbol within a slot.

13. The method of claim 8, wherein the RS in the AGC symbol and the SL-PRS in the SL-PRS symbols of the SL-PRS resource are transmitted via a same spatial filter.

14. The method of claim 8, wherein the RS in the AGC symbol and the SL-PRS in the SL-PRS symbols of the SL-PRS resource are quasi co-located (QCLed).

15. A reception user equipment (Rx UE), comprising:
a transceiver which, during operation, wirelessly communicates with at least one transmission user equipment (Tx UE); and
a processor communicatively coupled to the transceiver such that, during operation, the processor performs operations comprising:
receiving, via the transceiver, a first configuration for a sidelink-positioning reference signal (SL-PRS) resource;
receiving, via the transceiver, one automatic gain control (AGC) symbol for the SL-PRS resource; and
receiving, via the transceiver, the SL-PRS resource based on the first configuration, wherein a reference signal (RS) in the AGC symbol and an SL-PRS in a last SL-PRS symbol of the SL-PRS resource correspond to a same set of one or more subcarriers.

16. The Rx UE of claim 15, wherein the RS in the AGC symbol and the SL-PRS in the last SL-PRS symbol of the SL-PRS resource are configured with a same resource element (RE) offset.

17. The Rx UE of claim 15, wherein the AGC symbol is disabled by a second configuration.

18. The Rx UE of claim 15, wherein the AGC symbol comprises an SL-PRS.

19. The Rx UE of claim 18, wherein the SL-PRS comprises a sequence that is initialized based on a symbol index of the AGC symbol within a slot.

20. The Rx UE of claim 15, wherein, during operation, the processor further performs operations comprising:
adjusting a reception gain based on the AGC symbol; or performing a relative speed estimation based on the AGC symbol and the last SL-PRS symbol of the SL-PRS resource.

\* \* \* \* \*